Figure 1:
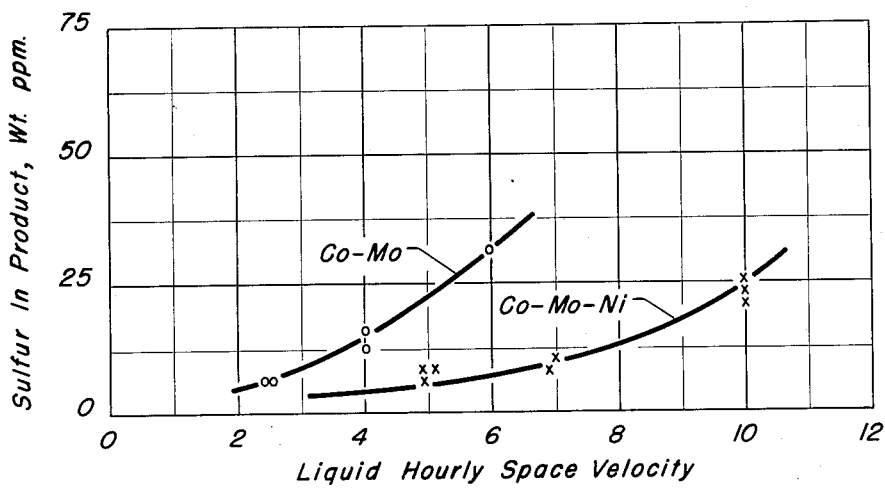

Jan. 9, 1962 — M. J. O'HARA — 3,016,347
HYDROCARBON PURIFICATION PROCESS AND CATALYST
Filed Sept. 21, 1959 — 3 Sheets-Sheet 1

INVENTOR:
Mark J. O'Hara

# United States Patent Office 3,016,347
Patented Jan. 9, 1962

3,016,347
HYDROCARBON PURIFICATION PROCESS
AND CATALYST
Mark J. O'Hara, Chicago, Ill., assignor to Universal Oil Products Company, Des Plaines, Ill., a corporation of Delaware
Filed Sept. 21, 1959, Ser. No. 841,402
14 Claims. (Cl. 208—216)

The present invention relates to processes for the purification, or treating, of hydrocarbons and hydrocarbon fractions, which processes utilize hydrodesulfurization catalysts in removing various metallic and non-metallic contaminants; the invention also relates to such catalysts and their manufacture. More specifically, the present invention involves the purification of hydrocarbon mixtures containing olefinic hydrocarbons, and further contaminated with sulfurous and nitrogenous compounds, through the utilization of a particular catalytic composite which has been prepared in a particular manner: the catalytic composite for use in the present invention is a four-component catalyst, and preferably a five-component catalyst. It is necessary that the catalytically active metallic components, of the catalyst employed in the present process, exist in the sulfided state prior to any contact with the particular hydrocarbons, or hydrocarbon mixture, to be treated. Accordingly, an essential feature of the present invention involves the utilization of a precise combination of manufacturing procedures in preparing the sulfided catalytic composite for use therein.

The purification process of the present invention may be utilized to great advantage in the preparation of saturated charge stocks, substantially free from combined sulfur and nitrogen, for use in other precesses. Within the petroleum industry, it is especially desirable to reform various straight-run gasolines, natural gasolines, catalytically-cracked naphtha fractions and/or thermally-cracked hydrocarbon distillates, for the purpose of improving the anti-knock characteristics thereof. Recently it has been found that catalytic reforming processes which utilize a catalyst consisting primarily of platinum and alumina, and particularly a catalyst which also contains combined halogen, are especially useful in the reforming of hydrocarbon fractions of the type hereinbefore set forth. The platinum-containing catalyst effects a highly desirable combination of reactions including the hydrocracking and isomerization of paraffins, the dehydrogenation of naphthenes to aromatics and the dehydrocyclization of paraffins to aromatics, and is thus especially efficient in increasing the octane rating of such hydrocarbon fractions. Through the proper selection of operating conditions, platinum-containing catalysts may be utilized for a relatively extended period of time when processing hydrocarbon fractions that are comparatively free from various contaminants. However, when effecting those reactions encompassed within the catalytic reforming operation, while processing charge stocks containing excessive concentrations of contaminants, there results a selective poisoning of the catalyst accompanied by a significant decline in the activity and stability thereof.

It is generally known that the most common contaminants, contained in a charge stock to a catalytic reforming operation, in addition to oxygenated compounds, are combined sulfur and combined nitrogen. Further, most charge stocks to catalytic reforming processes contain minor, but significantly detrimental quantities of metals such as arsenic, copper, lead, manganese, etc., which affect adversely the activity and stability of the particular platinum-containing catalyst employed. When such a charge stock is caused to contact the platinum-containing reforming catalyst, at reforming conditions, the combined sulfur and nitrogen are released from their respective hydrocarbon molecules, and are ultimately adsorbed onto and within the reforming catalyst. Such adsorption results in a decline in catalytic activity in addition to the normal activity decline resulting from the inherent deposition of coke and other carbonaceous material which shields the catalytically active centers from the material being processed. Elimination of the difficulties which arise as a result of the presence of various contaminants within the charge stock has been achieved with fair success through the use of suitable hydrodesulfurization catalysts at particular conditions of operation, whereby metallic contaminants are removed, combined sulfur and nitrogen are converted to hydrogen sulfide and ammonia, and olefinic hydrocarbons are saturated to form paraffins and naphthenes.

Many hydrocarbon stocks, charged to catalytic reforming processes, are derived as hydrocarbon distillates from the liquid product resulting from cracking processes, both catalytic and thermal. There exists an abundance of these cracked stocks boiling within the gasoline boiling range, which stocks may in part be employed as motor fuel, or preferably further processed to yield motor fuel or higher quality and in greater quantity. Cracked stocks are characterized, however, by a comparatively high degree of unsaturation, and, although possessing a relatively high octane rating, are unsuitable for widespread use, and in storage, tend to form sludges, gums and varnishes. In addition, distillates obtained by cracking processes usually have an appreciable combined sulfur and nitrogen content.

As hereinbefore stated, the catalytic reforming process greatly improves the characteristics of gasoline fractions through a combination of reactions including dehydrogenation to form aromatic hydrocarbons, isomerization of straight-chain hydrocarbons to form more highly-branched hydrocarbons, dehydrocyclizing of straight or slightly-branched chain hydrocarbons to form additional aromatic hydrocarbons and selective hydrocracking of heavier molecules to form the more desirable lighter molecules boiling within the gasoline boiling range. It becomes difficult to effect a successful reforming process on a highly unsaturated charge stock containing large quantities of sulfurous and nitrogenous compounds; the unsaturated compounds exhibit the tendency to polymerize and form a highly carbonaceous material which becomes deposited upon the reforming catalyst. As hereinbefore stated, the sulfur and nitrogen compounds are caused to form hydrogen sulfide and ammonia, both of which exhibit adverse effects toward the reforming catalyst.

A primary object of the present invention is to provide a process for the purification of contaminated hydrocarbons and mixtures of hydrocarbons, such that these hydrocarbons are extremely well suited as charge material to catalytic reforming processes, and particularly to those reforming processes which utilize a platinum-containing catalytic composite. The method of the present invention also affords advantages to the processing of hydrocarbon fractions, such as light cycle stocks, boiling in excess of the gasoline boiling range, which cycle stocks are generally employed as fuel oils. An essential feature of the present invention, by which the above object is attained, is the utilization of a catalyst prepared in a particular manner.

In a broad embodiment, the present invention relates to a process for the purification of hydrocarbons and mixtures of hydrocarbons which comprises contacting said hydrocarbons, containing undesirable contaminants, with a hydrodesulfurization catalyst in a hydrogenation reaction zone maintained under an imposed hydrogen pressure; said hydrodesulfurization catalyst containing an alumina-silica carrier material composited with the sulfides of molybdenum and nickel and having been prepared by reductively sulfiding an alumina-silica-molybdenum oxide-nickel oxide composite with a gaseous mixture of hydrogen sulfide and hydrogen; removing from said hydrogenation reaction zone a mixture of normally gaseous material and saturated liquid hydrocarbons; and thereafter separating said mixture into a gaseous phase and a liquid phase substantially free from the aforesaid undesirable contaminants.

In a more specific embodiment, the present invention provides a process for the purification of hydrocarbons and mixtures of hydrocarbons, contaminated by sulfurous and nitrogenous compounds, which comprises passing said contaminated hydrocarbons into a hydrogenation reaction zone, maintained under an imposed recycle hydrogen pressure in excess of about 100 pounds per square inch, and containing a hydrodesulfurization catalyst consisting of an alumina-silica carrier material composited with the sulfides of molybdenum, nickel, and cobalt, removing from said hydrogenation reaction zone a mixture of normally liquid hydrocarbons and normally gaseous material containing hydrogen sulfide and ammonia, thereafter subjecting said mixture to separation for the purpose of removing the normally gaseous material and recovering said liquid hydrocarbons substantially free from sulfurous and nitrogenous compounds; said hydrodesulfurization catalyst characterized by the method of preparation which comprises sulfiding an alumina-silica carrier material, composited with the oxides of molybdenum, nickel and from about 0.1% to about 0.7% by weight of cobalt, calculated as elemental cobalt, with a gaseous mixture of hydrogen and hydrogen sulfide, commingled in a mol ratio of from about 1:2 to about 4:1.

In another specific embodiment, the present invention affords a method of preparing a hydrodesulfurization catalytic composite which comprises forming an alumina-silica carrier material containing from about 0.1% to about 0.7% by weight of cobalt, compositing molybdenum with said cobalt-containing carrier material in an amount of from about 5% to about 10% by weight, and nickel in an amount of from about 1% to about 5% by weight, oxidizing the resulting mixture to form an alumina-silica-molybdenum oxide-nickel oxide-cobalt oxide composite, and thereafter sulfiding the resulting oxidized composite over a temperature range of about 400° F. to about 800° F. with hydrogen sulfide containing hydrogen in a mol ratio of about 1.5:1 to about 4:1 with respect to said hydrogen sulfide.

In a further and particularly preferred embodiment, the present invention provides a process for the purification of hydrocarbons and mixtures of hydrocarbons, contaminated by sulfurous and nitrogenous compounds and containing olefinic hydrocarbons, which comprises passing said olefinic-containing hydrocarbons, at a liquid hourly space velocity of about 1.0 to about 20.0, into a hydrogenation reaction zone maintained under an imposed pressure of from about 100 pounds per square inch to about 1000 pounds per square inch and at an inlet temperature thereto within the range of about 400° F. to about 750° F., in the presence of recycle hydrogen in an amount of about 1000 to about 5000 standard cubic feet per barrel of said hydrocarbons, said hydrogenation zone containing a hydrodesulfurization catalyst consisting of an alumina-silica carrier material composited with the sulfides of molybdenum, nickel and cobalt, removing from said hydrogenation zone a mixture of normally liquid saturated hydrocarbons and normally gaseous material containing hydrogen sulfide and ammonia, thereafter separating the normally gaseous material from said mixture and recovering said liquid saturated hydrocarbons substantially free from sulfurous and nitrogenous compounds; said hydrodesulfurization catalyst characterized by the method of preparation which comprises forming an alumina-silica carrier material containing cobalt in an amount from about 0.1% to about 0.7% by weight, and having an alumina to silica weight ratio within the range of about 7:1 to about 8:1, impregnating said cobalt-containing carrier material with aqueous solutions of molybdenum and nickel compounds to composite with said carrier material from about 5% to about 10% by weight of molybdenum and from about 1% to about 5% by weight of nickel, oxidizing the thus impregnated composite to form an alumina-silica-molybdenum oxide-nickel oxide-cobalt oxide composite, thereafter sulfiding the oxidized composite over a temperature range of about 400° F. to about 800° F. with hydrogen sulfide containing hydrogen in a mol ratio of about 1.5:1 to about 4:1 with respect to said hydrogen sulfide, and maintaining the thus sulfided hydrodesulfurization catalyst under a positive hydrogen sulfide pressure of about 5 to about 15 pounds per square inch while the sulfided catalyst is being cooled to a temperature below about 400° F.

The catalyst composition, provided by this invention in one of its principal embodiments, is characterized by a carrier material which comprises alumina and silica in a weight ratio within the range of about 3:1 to about 20:1, and which supports reductively sulfided oxides of molybdenum and nickel, having a molybdenum content of not more than about 10% by weight of the catalyst and a nickel content substantially less than that of the molybdenum. The reductively sulfided state of the aforesaid oxides of molybdenum and nickel being that which results from the treatment of the composite of said oxides and carrier material, with a mixture of hydrogen sulfide and hydrogen over a temperature range of from about 400° F. to about 800° F., and substantially in the absence of hydrocarbons. In a preferred form of this catalytic composite, the alumina is present with the silica in a weight proportion of about 7:1 to about 8:1, the molybdenum content is less than the silica content and the nickel content is substantially within the range of about 1% to about 5% by weight of the total catalyst. Moreover, this catalytic composition, in a particularly preferred embodiment, has a cobalt content which is less than the nickel content and within the range of about 0.1 to about 0.7% by weight, the cobalt content being in the form of cobalt oxide which has been converted to the aforesaid reductively sulfided state.

Processes for effecting the hydrogenation of unsaturated hydrocrabons and hydrocarbon fractions, which processes are shown to effect at least a partially successful pretreatment, or purification, of such hydrocarbons, are well-known and well-defined within the prior art. These processes make use of a hydrogenation catalyst consisting of an alumina carrier material which has been combined with catalytically active metallic components of cobalt and molybdenum. The prior art indicates a variety of methods for the preparation of such catalytic composites, as well as a wide range in the composition thereof. The various methods employed for the preparation of the cobalt and molybdenum-containing catalyst include single and double impregnations of the active metallic components, calcination at various elevated temperatures, reduction treatments, the use of various reagents in the impregnating procedure to yield a final composite in which the metallic components exist in some chosen, combined form, etc. Although the hydrogenation processes employing these cobalt and molybdenum containing catalysts may be advantageously utilized in treating various hydrocarbons, they fall short of fulfilling the present-day requirements which have been imposed on these processes as a result of the great demand for high quality distillate fuels and catalytically reformed products in large liquid volumetric yield. This demand has brought about a certain degree of criticality, and especially with respect to the condition of the particular hydrocarbon charge stock employed in the catalytic reforming process.

As hereinbefore set forth, the platinum-alumina catalyst, widely utilized in various catalytic reforming processes, is detrimentally affected by seemingly insignificant quantities of sulfurous, nitrogenous, and olefinic hydrocarbons. As a result of the emphasis placed upon the catalytic reforming processes, and the catalytic composite employed therein, there has been created the necessity of insuring an extended, successful period of operation of such processes. One particular means of obtaining this insurance is the preparation, or pretreatment, of the hydrocarbon-stock. The pretreating processes and purification catalyst of the prior art are insufficiently capable of treating the charge stocks to the extent that the same become sufficiently satisfactory for use in the presently employed catalytic reforming processes. The tolerable degree of concentration of the various contaminants previously described, has been lessened significantly due to the operating demands which have been placed on the catalyst employed within the reforming process. In short, the processes and hydrogenation catalysts of the prior art no longer suffice to prepare the charge stock to the extent which is now considered suitable for further processing in a catalytic reforming unit.

The process of the present invention utilizes at least a four-component catalyst comprising an alumina-silica carrier material which has been impregnated with particular quantities of molybdenum and nickel, and further prepared to yield a final catalyst in which the nickel and molybdenum exist as the sulfides thereof. I have further found that a five-component catalyst, the fifth component being a minor quantity of cobalt, may be utilized to greater advantage in processing hydrocarbon charge stocks designed to be utilized in the catalytic reforming process, as well as the purification of various heavy naphthas and cycle stocks which are to be used as fuel and lubricating oils. Whether the four-component or five-component catalyst is employed within the present process, the essential feature of this invention involves the preparation of such catalyst through the utilization of a precise combination of manufacturing procedures.

As hereinbefore set forth, the most common contaminants found in the various hydrocarbons, and hydrocarbon distillates, are olefinic hydrocarbons, nitrogenous compounds and sulfurous compounds. In regard to these contaminants, the hydrogenation of the olefinic hydrocarbons to yield paraffins and cyclic paraffins is most readily effected; the conversion of the sulfurous compounds into the hydrocarbon counterpart and hydrogen sulfide is slightly more difficult, whereas the removal of the nitrogenous compounds through the conversion of the same into the hydrocarbon counterpart and ammonia, is the most difficult to obtain. The degree of success, in regard to the elimination of nitrogenous compounds is dependent upon many considerations including the quantity thereof within the hydrocarbon being processed, the various physical and chemical characteristics of the hydrocarbon and the concentrations therein of the olefinic hydrocarbons and the sulfurous hydrocarbons. It has been found that the hydrogenation catalyst suffers a loss of activity for removing nitrogenous compounds as the removal of the olefinic and sulfurous hydrocarbons progresses. The activity of the four and five-component catalysts of the present invention, in regard to the removal of nitrogenous compounds, is virtually twice that exhibited by the widely utilized alumina-cobalt-molybdenum catalyst. The increased removal of nitrogen results in a definite improvement in subsequent catalytic reforming operations, and also permits the inclusion of greater quantities of cracked gasolines within the charge stocks to such reforming processes. In the case of intermediate naphthas, and light and heavy gas oils, the greater removal of nitrogen compounds affords improved color and storage stability since these nitrogen compounds exhibit the tendency to form gums and varnishes. The activity of the catalyst of the present invention, in regard to removal of sulfurous compounds, as well as for the hydrogenation of olefinic hydrocarbons, is also significantly greater than that of the presently utilized hydrogenation catalyst.

Briefly, the particularly preferred embodiment of the present invention utilizes a five-component catalyst consisting of an alumina-silica carrier material with which has been composited molybdenum, nickel and cobalt, the latter existing as the sulfides thereof prior to contact with the particular hydrocarbon mixture to be treated. This five-component catalyst is prepared by first co-precipitating the alumina-silica carrier material to contain the desired quantity of cobalt, within the range of about 0.1% to about 0.7% by weight, and impregnating the formed carrier material with a single impregnating solution containing suitable water-soluble molybdenum and nickel compounds. Following this single impregnating procedure, the resulting alumina-silica-cobalt-molybdenum-nickel composite is calcined in an atmosphere of air to convert the catalytically active metallic components to the oxides thereof. The oxidized composite is then subjected to a sulfiding technique by first being cooled to a temperature below about 500° F., and contacted at this temperature with a gaseous sulfiding medium comprising hydrogen and hydrogen sulfide, the hydrogen being present in the greater concentration. The temperature of the composite during the initial sulfiding procedure is increased to a level of about 750° F., and the sulfiding continued at this temperature for a period of about one hour. Following the complete sulfidation of the catalytically active metallic components, hydrogen sulfide is introduced intermittently to maintain a positive pressure of hydrogen sulfide on the sulfided catalyst, while the latter is being cooled to a temperature below about 400° F. At this stage of the manufacturing procedure, a stream of suitably inert gaseous material such as nitrogen may be employed to cool the sulfided catalyst further in order to facilitate handling and storage.

Various modifications of this procedure may be employed to yield a catalytic composite possessing a high degree of activity in regard to the removal of sulfurous and nitrogenous compounds, in addition to the saturation of olefinic hydrocarbons. Such modifications include the preparation of a four-component catalyst, differing from the five-component catalyst in the omission of the cobalt component therefrom. Both single and double impregnating techniques may be employed; that is, the active metallic components may be individually and separately composited with the carrier material while employing calcination procedures following each individual impregnation. The order in which the metallic components are combined may be altered without removing the method of manufacture from the broad scope of the present invention. In addition, various sulfiding techniques may be employed, however, the more active catalysts are produced by the method which comprises contacting the catalyst with a mixture of hydrogen sulfide and hydrogen at a comparatively low temperature, and maintaining such contact while the catalyst is being heated to the elevated temperature at which the greater portion of sulfidation takes place. As hereinbefore set forth, and as will be hereinafter indicated, beneficial results are obtained when a positive pressure of hydrogen sulfide is maintained on the catalyst while the latter is being cooled from the elevated sulfiding temperature to a temperature below about 400° F. Although the particularly preferred embodiment of the present invention employs a mixture of hydrogen and hydrogen sulfide as the sulfiding medium, in which mixture the hydrogen is predominating and within a mol ratio range of about 1.5:1 to about 4:1, excellent results, in regard to an increase of activity of the catalyst, have been achieved through the use of a sulfiding medium in which hydrogen sulfide predominates. Thus, the mol ratio of hydrogen to hydrogen sulfide may range from about 1:2 to about 4:1, with the more advantageous results being obtained with gaseous media in which the hydrogen is predominant and within the mol ratio range of about 2:1 to about 3:1. Beneficial results are obtained through the use of an alumina-silica carrier material having an alumina to silica weight ratio of about 3:1 to about 20:1. However, to avoid excessive hydrocracking, while obtaining the beneficial aspects of the combination, it is preferred that the alumina to silica weight ratio of the carrier material be within the range of 7:1 to about 8:1. It is understood that these slight modifications of the particularly preferred procedure do not remove the method of catalyst preparation from the broad scope of the present invention. The present invention is to be limited only within the scope and spirit of the appended claims.

The following examples are given for the purpose of illustrating the process of the present invention, and particularly for indicating the method by which the catalyst to be employed in such process is prepared. It is understood that slight modifications of the process flow and equipment, as well as insignificant changes in the conditions, reagents and concentrations employed in these examples, are not considered to be outside the broad scope of the present invention.

The illustration of one of the specific embodiments, in the following Example I, is comparable to a semi-commercial method for the manufacture of 200 pounds of the five-component catalyst, and the use thereof in a unit which approximates a commercial-size hydrodesulfurization process. In regard to the manufacturing of the sulfided catalytic composite, the method has been separated into three major divisions in the interest of clarity and simplicity.

EXAMPLE I

Alumina-silica preparation

Water glass, containing 28% by weight of silica and having a specific gravity of 1.38, in an amount of 86 pounds was diluted with water to a total weight of 172 pounds. Similarly, 36 pounds of hydrochloric acid (32% by weight hydrogen chloride, having a specific gravity of 1.16) was diluted with water to a total weight of 80 pounds. In order to prevent formation of flocculent material, the hydrochloric acid and water glass solutions were intimately commingled with vigorous stirring. Cobalt nitrate was added to the resulting clear solution in an amount to yield a final catalytic composite containing 0.25% by weight of cobalt. 2300 pounds of an aqueous solution of aluminum sulfate were then added to the previously prepared water glass-hydrochloric acid mixture containing cobalt nitrate; the aqueous solution of aluminum sulfate contained 7.65% by weight of aluminum oxide and 26% by weight of aluminum sulfate, and had a specific gravity of 1.31. Approximately 1276 pounds of the resulting mixture were simultaneously commingled with 260 pounds of an aqueous solution of 28% by weight ammonium hydroxide. The individual rates of the two solutions, at which the commingling was effected, were such that the pH of the resulting mixture was maintained at a constantly acidic level of about 6.0, not being permitted to vary beyond the limits of 5.5 to 6.5.

600 pounds of the 28% by weight aqueous solution of ammonium hydroxide were added to the constantly acidic, pH-6 precipitation mixture, and the second half (approximately 1276 pounds) of the aluminum sulfate-water glass-hydrochloric acid solution added thereto at a rate sufficient to control the pH of the resulting precipitating mixture at a level within the range of about 8.0 to about 8.5. The resulting finally divided slurry of basic aluminum sulfate, in admixture with aluminum hydroxide, and containing co-precipitated cobalt, was subjected to filtration for the purpose of removing the greater portion of the excess water. Hot water was employed to wash the filter cake, the pH of each resulting slurry being adjusted with ammonium hydroxide to a level of about 8.0. The final filter cake was dried to contain volatile matter in an amount from about 17% to about 20% by weight, and the thus dried material was ground into a talc-like powder. A suitable lubricating and binding agent was added thereto, and the powder formed into ⅛"×⅛" cylindrical pills possessing a crushing strength of about twelve pounds. The formed pills were then calcined, in an atmosphere of air, for a period of about 2 hours and at a temperature of 1240° F. The calcined pills contained less than about 1.0% by weight of sulfate ions, and had a highly desirable apparent bulk density within the range of about 0.48 to about 0.52.

Catalyst impregnating procedure

Approximately 236 grams each of molybdic acid (85% by weight molybdic oxide) and hydrated nickel nitrate (containing nickel in an amount to yield a final catalytic composite containing about 2% by weight thereof) were individual and separately commingled with 236 ml. of a 28% by weight solution of ammonium hydroxide. The individual solutions were then commingled to form the nickel-molybdenum impregnating solution which was then intimately commingled with the previously prepared, cobalt-containing alumina-silica carrier material. The impregnated alumina-silica pills were then dried for a period of three hours at a temperature of about 300° F.; the temperature was increased to 1100° F., and the composite calcined in an atmosphere of air for a period of about one hour at the elevated temperature.

Pre-sulfiding procedure

The dried, impregnated, alumina-silica pills were swept with a stream of nitrogen, at the elevated calcination temperature of 1100° F. for the purpose of purging the composite of any free oxygen remaining from the calcination procedure, and to cool the oxidized composite to a temperature below about 500° F., and preferably as low as 400° F. To insure the absence of free oxygen within and about the catalytic composite, prior to contacting the composite with hydrogen sulfide, hydrogen was added to the stream of nitrogen, and the catalyst swept therewith for a period of about fifteen minutes. A gaseous mixture of hydrogen sulfide, hydrogen and nitrogen, obtained from a gas reservoir, hereinafter described, was passed through the catalytic composite on a once-through basis, the effluent gases therefrom being vented to a gas scrubber. This initial sulfiding step employed a gaseous mixture containing six parts of hydrogen, two parts of hydrogen sulfide, and two parts of nitrogen, or a mol ratio of hydrogen to nitrogen of 3:1, and a mol ratio of hydrogen to hydrogen sulfide of 3:1. The temperature of the catalyst was then increased to 700° F., and the component concentration of the gaseous sulfiding mixture changed to the extent that the mol ratio of hydrogen to hydrogen sulfide was decreased to about 2:1, the mol ratio of hydrogen to nitrogen remaining at a level of about 3:1. This gaseous sulfiding mixture was externally recycled through a condenser and water separator, and returned to the inlet of the sulfiding zone. While the gaseous sulfiding mixture was recycled through the sulfiding zone, the temperature of the catalyst therein was increased to a level of about 750° F., and maintained at this level for a period of about two hours. The sulfiding stream was discontinued, and the catalyst cooled to a temperature of about 300° F.; during the period of cooling, from the sulfiding temperature of 750° F. down to 300° F., a positive pressure of 10 pounds per square inch was maintained upon the sulfiding zone through the intermittent introduction of 100% hydrogen sulfide. After the catalyst temperature reached a level of 300° F., a stream of nitrogen was introduced for the purpose of purging the same of any possible residual hydrogen sulfide and/or hydrogen, the vent gases being transmitted to a gas reservoir for utilization in the initial portion of the next succeeding sulfiding procedure effected upon the next batch catalyst.

The final catalytic composite, prepared as hereinabove set forth, was a five-component catalyst consisting of about 6.0% by weight of molybdenum, 2.0% by weight of nickel and 0.25% by weight of cobalt, all of which existed within the composite as the sulfides thereof. The concentrations herein given are those of the elemental metals, and not those of the combined form thereof: as a result, the proportions of the carrier material, in the final catalytic composite, were approximately 76.0% by weight of alumina (as $Al_2O_3$) and 11.0% by weight of silica (as $SiO_2$). Although the concentrations of molybdenum, nickel and cobalt may be varied within the ranges hereinbefore set forth, the alumina to silica weight ratio is maintained constant at a level of about 7:1 to about 8:1.

To illustrate the advantages afforded through the utilization of the process of the present invention, and the use therein of the sulfided, five-component catalyst hereinabove described, reference is made to the accompanying figures.

Figure 2:
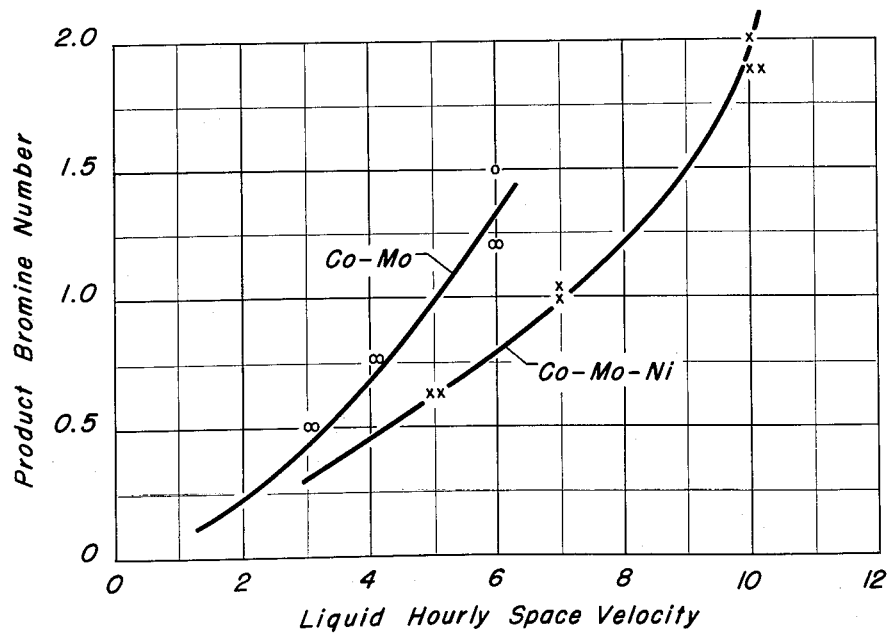
Figure 3:
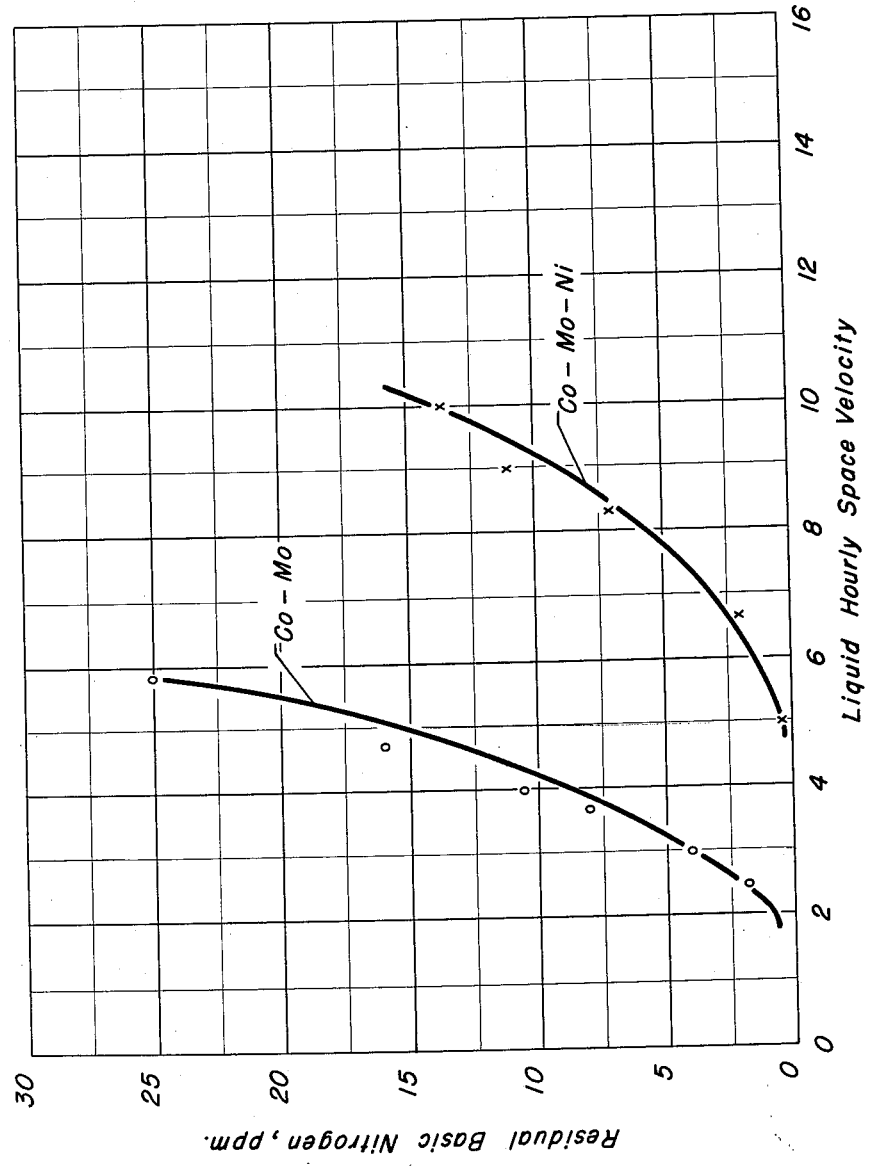

FIGURE 1 is a graphical representation which compares the results, with respect to the residual sulfur content of the liquefied hydrogenated product, obtained through the use of the well-known alumina-cobalt-molybdenum catalyst and the sulfide, five-component catalyst of the present invention. FIGURE 2 is an illustration of the comparison of the results obtained with these two catalysts in regard to the bromine number as determined on the saturated hydrocarbon product. The bromine number is an indication of the quantity of olefinic hydrocarbons within the given liquid hydrocarbon mixture; the higher the bromine number, the greater the weight percent concentration of unsaturated molecules. FIGURE 3 indicates the significant difference in the quantity of residual basic nitrogen compounds with the individual liquid products resulting from the processes employing the two catalysts.

The cobalt-molybdenum catalyst, employed as the standard hydrogenation catalyst, with which the catalyst of the process of the present invention is compared, was a three-component catalyst consisting of an alumina carrier material composited with about 6% by weight molybdenum and 2.2% by weight of cobalt. The catalyst was prepared by impregnating ⅛"×⅛" alumina pills with a single impregnating solution of molybdic acid containing 85% by weight of molybdenum oxide and sufficient cobalt nitrate to composite the 2.2% by weight of cobalt. Following the impregnation, this standard catalyst was subjected to calcination in an atmosphere of air, followed by the sulfiding technique which utilized a stream of pure hydrogen sulfide, diluted only by an inert gaseous material such as nitrogen. This sulfiding technique was effected at an elevated temperature of about 750° F.

Each catalyst was individually and separately tested by processing a thermally-cracked California naphtha therethrough; this charge stock was characterized by an API gravity of 43.3° at 60° F., an initial volumetric distillation point of 290° F., a 50% distillation point of 320° F. and an end boiling point of 392° F. (ASTM distillation method D86–56). The thermally-cracked naphtha contained 1.46% by weight of sulfur, 240 p.p.m. of basic nitrogen and had a bromine number of 61, the latter indicating that the naphtha contained a significant quantity of unsaturated hydrocarbons. The charge stock was passed into a reactor fabricated from 1-inch, schedule 80, type 316 stainless steel. The reactor was equipped with a thermocouple well to which perforated baffle plates were fastened to serve as the vaporization, pre-heating and mixing zone for the recycle hydrogen and the liquid hydrocarbon charge. The reactor contained a single catalyst bed of 50 cubic centimeters, and was maintained under an imposed hydrogen pressure of 800 pounds per square inch, the hydrogen being recycled at a rate of 3000 standard cubic feet per barrel of liquid charge; the inlet temperature to the catalyst in each instance was 700° F.

The two operations were each individually effected at several varying liquid hourly space velocities (liquid hourly space velocity is defined as the volume of liquid hydrocarbon charged to the reaction zone per volume of catalyst contained within the reaction zone). The liquid hourly space velocity was varied for the purpose of obtaining several points from which the curves indicated in the figures could be defined. Referring now to FIGURE 1, it is immediately noted that the curve representing the results obtained through the use of the five-component catalysts of the present invention (labeled "Co-Mo-Ni") is, at all points along its length, below the curve representing the results obtained through the use of the standard cobalt-molybdenum catalyst (labeled "Co-Mo"). This factor is significant in that it indicates that a liquid product substantially lower in sulfur content may be obtained through the use of the catalyst of the present invention at the same liquid hourly space velocity, or conversely, a greater liquid hourly space velocity is possible when utilizing the catalyst of the present invention to obtain a liquid product containing the same sulfur concentration as that obtained when the standard cobalt-molybdenum catalyst is used. For example, at the sulfur concentration of about 5 p.p.m. (0.0005% by weight), the maximum allowable liquid space velocity, employing the cobalt-molybdenum catalyst is about 2.3, whereas, when employing the catalyst of the present invention, a liquid hourly space velocity of about 5.0 is possible. When operating at identical liquid hourly space velocities, for example 6.0, the catalyst of the present invention lowers the sulfur concentration to about 6.3 p.p.m. (0.00063% by weight) while the cobalt-molybdenum catalyst results in a product containing about 37.5 p.p.m. sulfur (0.00375% by weight). The latter value is considerably in excess of that sulfur concentration which can be tolerated by the platinum-containing catalysts of the present-day catalytic reforming processes.

FIGURE 2 represents the comparison of the results in regard to the bromine number of the saturated liquid product. As hereinbefore stated, the bromine number is an indication of the degree of contamination by olefinic hydrocarbons. As indicated in FIGURE 2, the catalyst of the present invention lowered the bromine number of the original thermally-cracked naphtha to a level at all times less than that achieved through the use of the standard cobalt-molybdenum catalyst. Similarly, as was shown in regard to the sulfur concentration, the catalyst of the present invention permits a greater quantity of liquid throughput per volume of catalyst, while lowering the bromine number to an identical level.

Perhaps the most significant results are those illustrated in FIGURE 3, in which figure a comparison is made with respect to the residual basic nitrogen content of the liquid hydrogenated products. As hereinbefore set forth, the most difficult function of hydrodesulfurization catalysts is the removal of nitrogenous compounds. It is readily ascertained, referring to FIGURE 3, that the catalyst of the present invention presents little difficulty in providing a liquid hydrogenated product virtually free from basic nitrogen. At a liquid hourly space velocity of 5.0, the catalyst of the present invention resulted in a basic nitrogen content of about 0.25 p.p.m., whereas the standard cobalt-molybdenum catalyst produced a liquefied product contaminated by 25 p.p.m. of basic nitrogen at this liquid hourly space velocity.

This example clearly indicates the detailed method by which the five-component catalyst of the present invention is manufactured, and the unusually excellent results obtained through the utilization thereof.

Figure 4:
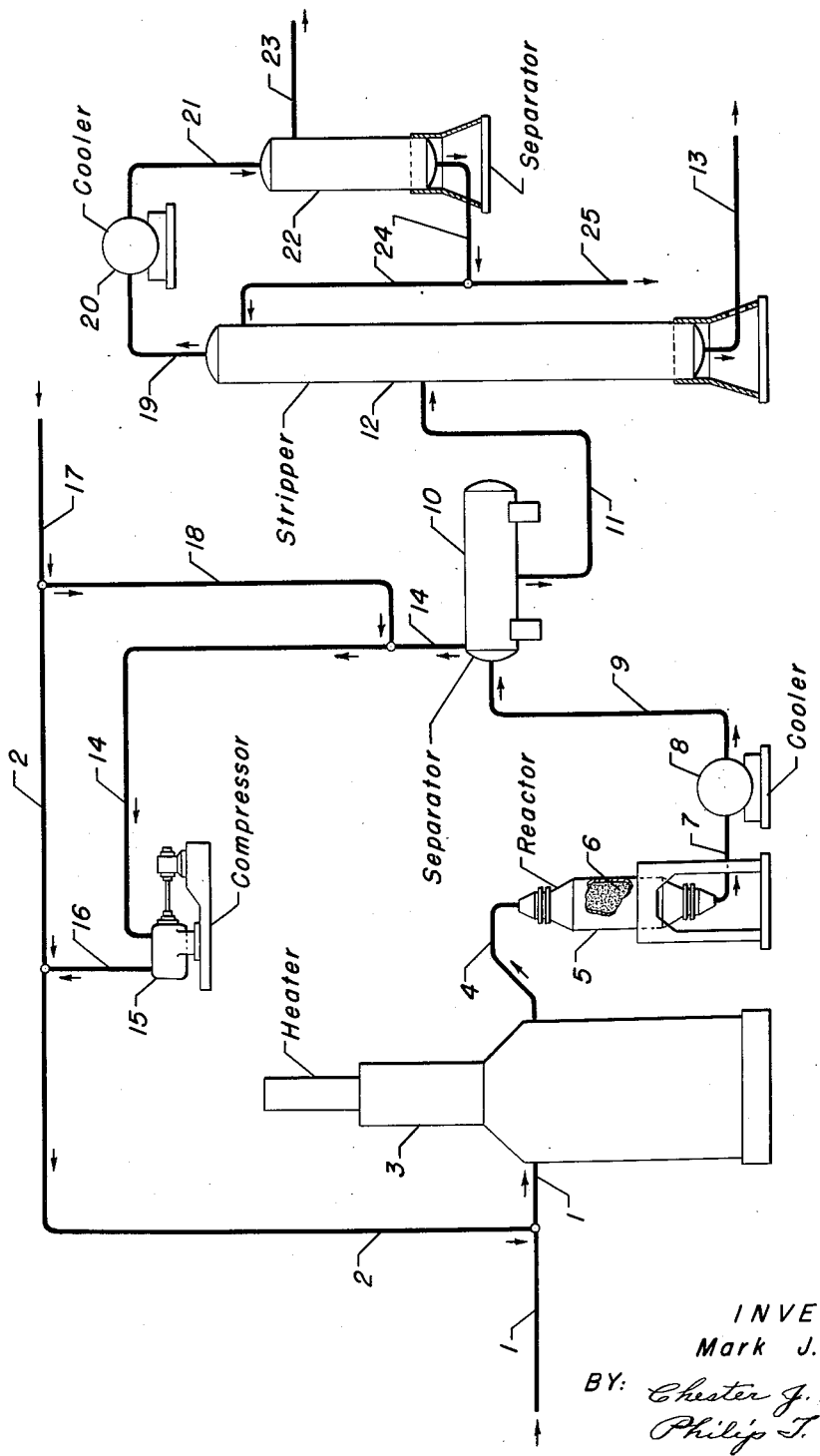

The process of the present invention is illustrated in the accompanying FIGURE 4; in the interest of simplicity and clarity, various heaters, condensers, valves, controls, instruments, etc., are eliminated from the drawing: only the vessels and connecting lines necessary for complete understanding of the process are indicated. The hydrocarbon, or hydrocarbon mixture, containing sulfurous and nitrogenous compounds as well as a significant quantity of olefinic type hydrocarbons, is introduced into the process through line 1. These hydrocarbons are commingled with a hydrogen-rich recycle gas stream in line 2, the resulting mixture being heated to the operating temperature in heater 3 and introduced through line 4 into reactor 5. Reactor 5 is illustrated as a single reaction zone in which the material to be processed is passing downflow through catalyst bed 6. Catalyst bed 6 consists of an alumina-silica carrier material with which is composited molybdenum, nickel and less than 0.7% by weight of cobalt, these three metals existing as the sulfides thereof prior to, and during, contact with the hydrocarbons entering through line 4. The reaction products are passed through line 7 into cooler 8 and through line 9 into separator 10. Separator 10 is operated at substantially room temperature to facilitate removal of the normally gaseous components through line 14 into compressor 15. Compressor 15 discharges through line 16 into line 2, and, as hereinbefore stated, is commingled with the hydrocarbon charge in line 1. Where necessary, an outside source may be employed to supply the hydrogen necessary to effect complete saturation and removal of the various contaminants, and to maintain the quantity of hydrogen recycle. Such outside source is indicated as entering the process through line 17, and may be directed either to the suction side of the compressor through line 18, or directly into heater 3 through line 2.

The normally liquid reaction products are removed from separator 10 through line 11, and introduced into stripper column 12. A hydrogenated liquid product, substantially free from nitrogenous and sulfurous compounds is removed from stripper 12 through line 13. The liquid product in line 13 may either be utilized as is, or may be subjected to further processing and/or fractionation as the particular case may be. A mixture of normally gaseous material and light hydrocarbons is removed from the top of stripper 12 through line 19, and passed through cooler 20 and line 21 into separator 22. A gaseous stream is removed from separator 22 via line 23 and contains a greater portion of hydrogen sulfide, ammonia, and those light paraffinic hydrocarbons which may have resulted from the slight degree of hydrocracking inherent in processes employing elevated temperatures. The liquid overhead product is removed through line 24 and utilized as reflux through stripper column 12. Where desired, a portion of this liquid overhead product may be removed through line 25 and either subjected to further processing, or utilized as fuel.

Slight modifications of the process hereinabove described are not considered to be outside of the broad scope thereof. For example, provision may be made for the introduction of water upstream of separator 10 for the purpose of adsorbing the ammonia formed during the conversion of nitrogenous compounds. Separator 10 is then modified to permit a separate water draw-off by which means the ammonia is removed from the process. Similarly, the separation of the total reactor effluent into the gaseous and liquid phase may be effected in two or more stages. The flow through the bed, or beds, of catalyst may be crossflow, upflow or downflow as illustrated. Other modifications will be readily recognized by those possessing sufficient skill within the art.

EXAMPLE II

A comparison of the catalysts, as prepared in the foregoing Example I, was made while processing a blend of straight-run and coker distillates. The charge stock characteristics, including the concentrations of the various contaminates, the catalyst evaluation conditions, and a brief summary of the product inspection data are given in the following Table I.

TABLE I.—CATALYST COMPARISON—BLEND OF STRAIGHT RUN AND COKER DISTILLATES

| Charge Stock Characteristics: | | |
| --- | --- | --- |
| Gravity, °API @ 60° F. | 55.9 | |
| Initial Boiling Point, ° F. | 194 | |
| 50% Boiling Point, ° F. | 280 | |
| End Boiling Point, ° F. | 409 | |
| Nitrogen Content, p.p.m. | 9.4 | |
| Bromine Number | 7.2 | |
| Sulfur Concentration, Wt. percent | 0.052 (520 p.p.m.) | |
| Catalyst Evaluation Conditions: | | |
| Catalyst Designation | A | B |
| Operating Pressure, p.s.i.g | 800 | 800 |
| Catalyst Temperature, ° F. | 700 | 700 |
| Hydrogen Circulation, s.c.f.b. | 800 | 800 |
| Liquid Hourly Space Velocity | 6 | 14 |
| Product Inspection: | | |
| Gravity, °API @ 60° F. | 56.2 | 56.2 |
| Initial Boiling Point, ° F. | 207 | 190 |
| 50% Boiling Point, ° F. | 278 | 274 |
| End Boiling Point, ° F. | 411 | 416 |
| Nitrogen Content, p.p.m. | 0.24 | 0.20 |
| Bromine Number | 0.4 | 0.3 |
| Sulfur Concentration, Wt. percent | 0.0012 (12 p.p.m.) | 0.00006 (0.6 p.p.m.) |

The standard hydrogenation catalyst, comprising alumina, cobalt and molybdenum, is designated as catalyst "A," and the catalyst of the present invention, being the five-component catalyst containing the sulfides of nickel, molybdenum and cobalt, is designated as catalyst "B." As indicated in the table, although the concentration of the various contaminants was originally relatively low, both catalysts effected a considerable degree of purification of the distillate blend. Perhaps the two most significant factors to be derived from the tabulated data are concerned with the liquid hourly space velocity at which the catalysts were compared, and the concentration of sulfur remaining in the liquid product derived therefrom. Catalyst "A" lowered the sulfur concentration from 0.052 weight percent (520 p.p.m.) to a level of 0.0012 weight percent (12 p.p.m.): the sulfur concentration of the liquid product resulting through the use of catalyst "B" was lowered to 0.00006 weight percent, or 0.6 p.p.m. It is seen that the catalyst of the present invention effected a considerably greater degree of purification than the standard catalyst employed in the purification process, even though the catalyst of the present invention was tested at a liquid hourly space velocity of 14, as compared to a liquid hourly space velocity of 6 during the testing of the standard hydrogenation catalyst. In short, the utilization of the process of the present invention, while employing the five-component catalyst therein, permits a much greater volumetric throughput while effecting a more substantial degree of purification of the charge stock.

The same type catalyst comparison, as hereinabove described, was made with respect to a hydrocarbon mixture which is more difficult to convert to a hydrocarbon which is suitable as a charge stock to a catalytic reforming unit, or which is more suitable for use as a lubricating or fuel oil. This charge stock was a light cycle oil having a gravity of 25.9° API at 60° F., and containing considerably greater concentrations of contaminants than the blend of straight-run and coker distillates described in Table I. Other charge stock characteristics, the catalyst evaluation conditions and various product inspection data are given in Table II. As indicated in the table, although the catalyst testing procedures were effected at identical conditions including the hourly space velocity, catalyst "B," the five-component catalyst of the present invention, was distinctly more successful in purifying the cycle stock.

TABLE II.—CATALYST COMPARISON—LIGHT CYCLE OIL

| Charge Stock Characteristics: | | |
|---|---|---|
| Gravity, °API, @ 60° F | 25.9 | |
| Initial Boiling Point | 324 | |
| 50% Boiling Point | 545 | |
| End Boiling Point | 670 | |
| Nitrogen Content, p.p.m | 322 | |
| Bromine Number | 15.6 | |
| Sulfur Concentration, Wt. percent | 0.34 (3400 p.p.m.) | |
| Catalyst Evaluation Conditions: | | |
| Catalyst Designation | A | B |
| Operating Pressure, p.s.i.g | 800 | 800 |
| Catalyst Temperature, ° F | 720 | 720 |
| Hydrogen Circulation, s.c.f.b | 2,000 | 2,000 |
| Liquid Hourly Space Velocity | 3 | 3 |
| Product Inspection: | | |
| Gravity, °API @ 60° F | | 29.1 |
| Initial Boiling Point | | 326 |
| 5% Boiling Point | | 473 |
| End Boiling Point | | 552 |
| Nitrogen Content, p.p.m | 55.0 | 12.5 |
| Bromine Number | 6.4 | 2.3 |
| Sulfur Concentration, Wt. percent | 0.02 (200 p.p.m.) | 0.02 (200 p.p.m.) |

In the additional examples hereinafter set forth, reference is made to a "Standard Relative Activity" test method. The relative activity of a particular catalyst is defined as the ratio of the space velocity required to result in a given product improvement, while employing the test catalyst, to the space velocity required to yield the same degree of product improvement while employing a primary, standard catalyst, which relative activity is expressed as a percentage. The catalyst employed as the standard catalyst was an alumina-cobalt-molybdenum composite consisting of about 2.2% by weight of cobalt and about 5.9% by weight of molybdenum. The product quality improvement was measured in terms of the residual basic nitrogen content of the liquid product: as hereinbefore stated, the removal of nitrogenous compounds is the function of a hydrodesulfurization catalyst most difficult to effect, and, therefore, the relative activity of a given catalyst is more logically based thereon, rather than on an improvement in either the sulfur concentration or the quantity of olefinic hydrocarbons as indicated by the bromine number.

The relative activity test method consists essentially of processing a particular middle fraction of a California thermally-cracked naphtha boiling within the range of 290° F. to 390° F. The catalyst is placed in a reaction zone in an amount of 50 cubic centimeters and a hydrogen pressure of 800 pounds per square inch is imposed thereon. The catalyst bed inlet temperature is maintained at a level of 700° F., and hydrogen is passed therethrough (on a once-through basis) in an amount of 3000 standard cubic feet per barrel of liquid charge. Three distinct test procedures are effected at various liquid hourly space velocities within the range of about 2 to about 10. The liquid effluent, upon which the product inspection is made, is collected over a period of operation of about 4 to about 7 hours. The thermally-cracked naphtha fraction, employed as the test charge stock, is further characterized in that the concentration of the contaminants is 1.33% by weight of sulfur, 300 p.p.m. of basic nitrogen, and a quantity of unsaturated hydrocarbons which gives a bromine number of 61. The basic nitrogen concentration in each of the three liquid products are plotted on a logarithmic scale against the reciprocals of the three space velocities employed. From the resulting curve, drawn through the three points, a determination is made of the reciprocal of the space velocity required to yield a liquid product having a residual basic nitrogen content of 2 p.p.m. The relative activity of the test catalyst is derived from the ratio of the reciprocal space velocity, to yield 2 p.p.m. basic nitrogen, in regard to the primary standard catalyst and compared to that of the catalyst being tested. The ratio is multiplied by the factor of 100, and a relative activity factor greater than 100% indicates a test catalyst having a greater activity than the primary standard catalyst; obviously, a catalyst having a relative activity less than 100%, is less active than the primary standard catalyst.

EXAMPLE III

A variety of catalytic composites were prepared in accordance with the procedure set forth in Example I, with slight modifications thereof, and subjected to the activity test as hereinabove described. The modifications of the procedure as set forth in Example I were concerned with the composition of the catalyst, the impregnating procedure and the sulfiding technique, the latter involving a change in the composition of the gaseous medium therein employed.

The first catalyst, designated in Table III as catalyst "C," was prepared by impregnating an alumina-silica carrier material with an aqueous solution containing nickel nitrate and molybdic acid to yield a catalyst having the composition indicated in Table III. The impregnating procedure was a single impregnation; that is, all the catalytically active metallic components to be composited with the carrier material were added thereto in a single step. The impregnated alumina-silica pills were calcined, in an atmosphere of air, at a temperature of 1100° F. for a period of one hour. The calcined pills were cooled to a temperature of about 500° F. with a mixture of hydrogen and nitrogen in a 3:1 mol ratio, hydrogen sulfide was added at this temperature, and the mixture of hydrogen, nitrogen and hydrogen sulfide recycled through the catalyst while the temperature thereof was increased to 750° F. The sulfiding was continued for a period of one hour at the elevated temperature; the composition of the sulfiding medium being a 3:1 mol ratio of hydrogen to nitrogen and a 1:2 mol ratio of hydrogen to hydrogen sulfide. As hereinafter set forth, it is preferred that the sulfiding medium have a mol ratio of hydrogen to hydrogen sulfide within the range of about 1.5:1 to about 4:1. It has been found that the chemical equilibrium existing between the metallic components to be sulfided and the gaseous medium employed for the sulfiding, affects the activity and stability of the final catalytic composite through the deposition of elemental sulfur. Although an active hydrodesulfurization catalyst may be produced when hydrogen sulfide is present in greater concentration than the hydrogen, a still more active catalyst is prepared when the hydrogen is of the greater concentration, and within the aforesaid range of a mol ratio of about 1.5:1 to about 4:1 and more preferably from about 2:1 to about 3:1. Further, there are no detrimental effects as a result of the deposition of elemental sulfur. After one hour at the elevated temperature of 750° F., the sulfided catalytic composite was cooled to a temperature of 300° F., and during this cooling, a positive pressure was maintained through the intermittent introduction of hydrogen sulfide, the hydrogen and nitrogen having been shut off. The catalyst was then further cooled to a temperature of 100° F. utilizing a stream of nitrogen.

TABLE III.—ACTIVITY OF NICKEL-MOLYBDENUM CATALYSTS

| Catalyst Designation | C | D | E | F | G | H | I |
|---|---|---|---|---|---|---|---|
| Catalyst Composition, wt. percent: | | | | | | | |
| Nickel | 2.23 | 2.22 | 2.33 | 2.24 | 2.46 | 2.07 | 1.87 |
| Molybdenum | 5.51 | 6.43 | 5.82 | 5.88 | 5.44 | 5.88 | 5.84 |
| Cobalt | | | 0.25 | 0.24 | 0.19 | 0.31 | 0.25 |
| Impregnating Procedure: | | | | | | | |
| Type | Single | Single | Single | Double | Double | Single | Double |
| First Solution | | | | Co | Ni—Mo | | Ni—Mo |
| Sulfiding Technique (Components Present): | | | | | | | |
| Nitrogen | x | x | x | | | | x |
| Hydrogen | x | | x | | | | x |
| Hydrogen Sulfide | x | x | x | x | x | x | x |
| Activity Test Data: | | | | | | | |
| Relative Activity | 216 | 142 | 194 | 181 | 191 | 158 | 203 |
| Carbon,[1] wt. percent | 0.60 | 0.90 | 0.65 | 0.65 | 0.66 | 0.79 | 0.66 |

[1] Carbon deposition as a result of the activity test.

The second catalyst, designated in Table III as catalyst "D," was prepared utilizing a single impregnating procedure and a sulfiding medium consisting of hydrogen sulfide diluted with an inert gas, nitrogen. A comparison of the activities of the two catalysts, "C" and "D," indicates a substantial increase in the relative activity of the catalyst when the composition of the sulfiding medium is considered. Primarily, the sole difference in the preparation of the two catalysts was the change in the sulfiding medium from a mixture of hydrogen and hydrogen sulfide to pure hydrogen sulfide, the nitrogen effectively disregarded as being an inert material. In addition, a significantly lesser quantity of carbon was deposited upon catalyst "C" in the activity test procedure.

Five additional catalysts were prepared, varying the method of preparation, but all of which contained minor quantities of cobalt in addition to the nickel and molybdenum. The compositions of these catalysts, as well as the impregnating and sulfiding procedures, are given in Table III. The double impregnating procedures indicated for catalysts "F," "G" and "I," were effected through the use of two separate solutions, one containing both nickel and molybdenum compounds and the other containing only cobalt. The catalysts were subjected to high temperature calcination at a temperature of 1100° F. between the two impregnating steps. Catalyst "F" was prepared by depositing the cobalt first, and following with the solution containing the nickel and molybdenum. Catalysts "G" and "I" were prepared by the method which comprises impregnating with the nickel and molybdenum compounds prior to the addition of the cobalt. The preparation of catalyst "H" employed a single impregnating procedure and a sulfiding medium consisting solely of hydrogen sulfide.

It is readily ascertained that catalysts "D" and "H" are significantly less active, and effect a greater carbon deposition, than the catalysts prepared by other means. Catalysts "D" and "H" employed a single impregnation, and pure hydrogen sulfide in the sulfiding procedure. Catalysts "C," "E," "F," "G" and "I" were prepared by various methods which incorporated several of the embodiments of the present invention. As hereinafter indicated, the particularly preferred method of the present invention utilizes a catalyst prepared via a single impregnation procedure and a sulfiding technique utilizing a mixture of hydrogen and hydrogen sulfide. In this particular preferred catalyst, the cobalt component is co-precipitated with the alumina-silica prior to the formation of the latter into the desired size and shape.

EXAMPLE IV

This example is given to illustrate the desirability of pre-sulfidation of the catalyst, in regard to the overall stability thereof, and also to indicate the unexpected benefits derived from utilizing nickel and molybdenum as compared to a catalyst consisting essentially of cobalt and molybdenum. The catalysts were tested over a period of more than 24 days, the space velocity being continually adjusted to yield a liquid product having about 2 p.p.m. residual basic nitrogen. This is in accordance with the "Standard Relative Activity" test procedure hereinbefore set forth in detail. The California thermally-cracked naphtha fraction was processed at a temperature of 700° F., a pressure of 800 pounds per square inch and in the presence of 3000 standard cubic feet of hydrogen recycle per barrel of liquid hydrocarbon charge. As hereinbefore stated, the relative activities are based upon the results obtained using the standard alumina-cobalt-molybdenum catalyst.

The first catalyst subjected to the 24-day stability test was the standard hydrogenation catalyst, consisting of cobalt and molybdenum on an alumina carrier material, which catalyst was subjected to a pre-sulfiding technique at 700° F. while employing a mixture of hydrogen and hydrogen sulfide in a mol ratio of about 2:1. After 5 days, the relative activity of this catalyst was 138; after 18 days the relative activity had decreased to 135, and at the end of 25 days, the activity was found to be 131. It is immediately noted that a mere pre-sulfiding procedure, in accordance with the present invention, increased the relative activity of the standard catalyst a substantial degree.

The second catalyst subjected to the extended stability test was a cobalt-molybdenum catalyst composited with a silica-alumina carrier material in which the ratio of alumina to silica was 7.3:1. After 5 days of operation, the relative activity of this catalyst was 186; after 12 and 19 days of operation, the relative activity was 169 and 163 respectively; at the end of 25 days, the relative activity was 142, which activity is greater than the initial activity of the catalyst in which the carrier material consisted solely of alumina.

A nickel-molybdenum catalyst, composited with the alumina-silica carrier material, and pre-sulfided with a mixture of hydrogen and hydrogen sulfide, existing in a mol ratio of 2:1 in accordance with the method of the present invention, indicated a relative activity of 234 after the first 6 days of the stability test. This catalyst, after a total of 14 days indicated an activity of 234; after 24 days, the relative activity was 225.

EXAMPLE V

This example is given for the purpose of illustrating the effect of various pre-sulfiding techniques on the activity of the catalyst. The data in Table IV indicate advantageous results from the use of all the catalysts so prepared, however, it is apparent that the catalyst prepared in accordance with the particularly preferred embodiment of the present invention is the more highly active catalyst. The catalysts were tested in accordance with the previously described relative activity test procedure, utilizing the California thermally-cracked naphtha fraction. The first catalyst, designated as catalyst "J"

was prepared to contain 6.0% molybdenum and 2.0% nickel, composited with the alumina-silica carrier. The molybdenum and nickel were deposited via a single impregnating procedure and the catalyst immediately subjected thereafter to calcination and sulfidation utilizing a sulfiding medium of hydrogen and hydrogen sulfide in a 2:1 mol ratio. The catalyst was contacted with the sulfiding mixture at a temperature of about 500° F. and was maintained in contact therewith while the temperature was increased to 750° F. A positive pressure of hydrogen sulfide was maintained while cooling the sulfided catalyst to a temperature of 300° F. This catalyst indicated a relative activity of 193. The same catalyst, with the addition of 0.25% by weight of cobalt to the alumina-silica, designated as catalyst "L," indicated a relative activity of 195. A decrease in activity was observed on the catalyst which was exposed to air while being cooled from the sulfide temperature of 750° F. This catalyst is designated as catalyst "M."

Catalyst "K" was prepared by the method which consisted of a double impregnating technique in which the alumina-silica carrier material is formed and calcined prior to being impregnated with the cobalt component. Following the cobalt impregnation, the catalyst was again calcined at an elevated temperature, after which a single impregnating solution was utilized to composite therewith the molybdenum and nickel. In addition, catalyst "K" was subjected to a hydrogen pre-treatment, rather than a 3:1 mixture of hydrogen and nitrogen, prior to being contacted with the sulfiding gaseous mixture at 750° F. It is immediately noted that this catalyst exhibited the lowest relative activity.

The catalyst prepared by the particularly preferred embodiment of the present invention, catalyst "N," in which embodiment the cobalt, alumina and silica are commingled prior to the formation of the carrier material, and the molybdenum and nickel are composited in a single impregnating procedure, and which includes the hydrogen sulfide contact at the lower temperature while the catalyst is being heated to the sulfiding temperature of 750° F., indicated the highest relative activity, that of 242.

pared by sulfiding alumina-silica-molybdenum oxide-nickel oxide with a gaseous mixture of hydrogen sulfide and hydrogen over a temperature range increasing from about 400° F. to about 750-800° F. and thereafter cooling the sulfided composite to below 400° F. while maintained under a positive pressure of hydrogen sulfide; removing from said hydrogenation reaction zone a mixture of normally gaseous material and saturated normally liquid hydrocarbons; and thereafter separating said mixture into a gaseous phase and a liquid phase substantially free from the aforesaid undesirable contaminants.

2. A process for the purification of hydrocarbons and mixtures of hydrocarbons, contaminated by sulfurous and nitrogenous compounds, which comprises passing said contaminated hydrocarbons into a hydrogenation reaction zone, maintained under an imposed hydrogen pressure in excess of about 100 pounds per square inch and containing a hydrodesulfurization catalyst comprising an alumina-silica carrier material composited with the sulfides of molybdenum and nickel, removing from said hydrogenation reaction zone a mixture of normally liquid hydrocarbons and normally gaseous material containing hydrogen sulfide and ammonia, thereafter subjecting said mixture to separation to recover said liquid hydrocarbons substantially free from the aforesaid sulfurous and nitrogenous compounds; said hydrodesulfurization catalyst characterized by the method of preparation which comprises sulfiding an alumina-silica carrier material, composited with the oxides of molybdenum and nickel, with hydrogen sulfide containing hydrogen in excess of a mol ratio of about 1.5:1 with respect to said hydrogen sulfide over a temperature range increasing from about 400° F. to about 750-800° F. and thereafter cooling the sulfided composite to below 400° F. while maintained under a positive pressure of hydrogen sulfide.

3. The method of claim 2 further characterized in that said hydrodesulfurization catalyst contains cobalt sulfide in an amount of from about 0.1% to about 0.7% by weight, calculated as elemental cobalt.

4. A process for the purification of hydrocarbons and mixtures of hydrocarbons, contaminated by sulfurous and nitrogenous compounds, which comprises passing said

TABLE IV.—EFFECT OF PRE-SULFIDING TECHNIQUE

| Catalyst Designation | J | K | L | M [1] | N |
|---|---|---|---|---|---|
| Catalyst Composition, wt. percent: | | | | | |
| Molybdenum | 6.0 | 6.0 | 6.0 | 6.0 | 6.0 |
| Nickel | 2.0 | 2.0 | 2.0 | 2.0 | 2.0 |
| Cobalt | | 0.25 | 0.25 | 0.25 | 0.25 |
| Hydrogen Pretreatment | No | Yes | No | No | No |
| Impregnating Technique | Single | Double | Single [2] | Single [2] | Single [2] |
| Relative Activity | 193 | 180 | 195 | 190 | 242 |

[1] Sulfided catalyst exposed to air without cooling in hydrogen sulfide.
[2] 0.25 wt. percent cobalt incorporated with the alumina-silica carrier material.

The foregoing examples clearly illustrate the several embodiments of the process of the present invention and the manufacture of the catalytic composites to be utilized therein. The benefits afforded to processes for the purification, or treating, of various hydrocarbons and hydrocarbon mixtures are indicated. The process of the present invention, employing a particular catalyst, results in a hydrocarbon product which is substantially completely free from the various contaminants which otherwise prohibit the use or further processing of such hydrocarbons.

I claim as my invention:

1. A process for the purification of hydrocarbons and mixtures of hydrocarbons, containing undesirable contaminants, which comprises contacting said hydrocarbons with a hydrodesulfurization catalyst in a hydrogenation reaction zone maintained under an imposed hydrogen pressure; said hydrodesulfurization catalyst containing an alumina-silica carrier material composited with the sulfides of molybdenum and nickel and having been precontaminated hydrocarbons into a hydrogenation reaction zone, maintained under an imposed hydrogen pressure in excess of about 100 pounds per square inch, and containing a hydrodesulfurization catalyst consisting of an alumina-silica carrier material composited with the sulfides of molybdenum, nickel and cobalt, removing from said hydrogenation reaction zone a mixture of normally liquid hydrocarbons and normally gaseous material containing hydrogen sulfide and ammonia, thereafter separating said mixture to remove the normally gaseous material and to recover said liquid hydrocarbons substantially free from sulfurous and nitrogenous compounds; said hydrodesulfurization catalyst characterized by the method of preparation which comprises sulfiding an alumina-silica carrier material, composited with the oxides of molybdenum, nickel and from about 0.1% to about 0.7% by weight of cobalt, with hydrogen sulfide containing hydrogen in a mol ratio of about 1.5:1 to about 4:1 with respect to said hydrogen sulfide over a temperature range increasing from about 400° F. to about 750–800° F. and thereafter cooling the sulfided composite to below 400° F. while maintained under a positive pressure of hydrogen sulfide.

5. A method of preparing a hydrodesulfurization catalytic composite which comprises sulfiding an alumina-silica carrier material, composited with the oxides of molybdenum and nickel, with hydrogen sulfide containing hydrogen in an amount to yield a mol ratio of hydrogen to hydrogen sulfide within the range of about 1.5:1 to about 4:1, the sulfiding of said metal oxide-containing alumina-silica carrier material being effected over a temperature range increasing from about 400° F. to about 750–800° F., and thereafter cooling the sulfided composite to below 400° F. while maintained under a positive pressure of hydrogen sulfide.

6. A method of preparing a hydrodesulfurization catalytic composite which comprises forming an alumina-silica carrier material containing from about 0.1% to about 0.7% by weight of cobalt, compositing molybdenum with said cobalt-containing carrier material in an amount of from about 5% to about 10% by weight, and nickel in an amount of from about 1% to about 5% by weight, oxidizing the resulting mixture to form an alumina-silica-molybdenum oxide-nickel oxide-cobalt oxide composite, sulfiding the resulting oxidized composite over a temperature range increasing from about 400° F. to about 750–800° F. with a gaseous mixture of hydrogen sulfide containing hydrogen in a mol ratio of about 1.5:1 to about 4:1 with respect to said hydrogen sulfide, and thereafter cooling the sulfided composite to below 400° F. while maintained under a positive pressure of hydrogen sulfide.

7. The method of claim 6 further characterized in that said carrier material contains alumina in an amount to yield a weight ratio of alumina to silica in excess of about 3:1.

8. The method of claim 6 further characterized in that said sulfided hydrodesulfurization catalyst is maintained under a positive pressure of hydrogen sulfide of from about 5 to about 15 pounds per square inch while being cooled from the sulfiding temperature to a temperature below about 400° F.

9. A process for the purification of hydrocarbons and mixtures of hydrocarbons, contaminated by sulfurous and nitrogenous compounds, which comprises passing said contaminated hydrocarbons into a hydrogenation reaction zone, maintained under an imposed recycle hydrogen pressure within the range of about 100 pounds per square inch to about 1000 pounds per square inch, and containing a hydrodesulfurization catalyst consisting of an alumina-silica carrier material composited with the sulfides of molybdenum, nickel and cobalt, removing from said hydrogenation reaction zone a mixture of normally liquid hydrocarbons and normally gaseous material containing hydrogen sulfide and ammonia, and thereafter separating said mixture to remove the normally gaseous material and to recover said liquid hydrocarbons substantially free from sulfurous and nitrogenous compounds; said hydrodesulfurization catalyst characterized by the the method of preparation which comprises forming an alumina-silica carrier material having a weight ratio of alumina to silica of about 3:1 to about 20:1, and containing from about 0.1% to about 0.7% by weight of cobalt, impregnating said carrier material with an aqueous solution of molybdenum and nickel compounds to composite therewith from about 5% to about 10% by weight of molybdenum and from about 1% to about 5% by weight of nickel, oxidizing the impregnated carrier material to form an alumina-silica-molybdenum oxide-nickel oxide-cobalt oxide composite, thereafter sulfiding the oxidized composite over a temperature range increasing from about 400° F. to about 750–800° F. with a gaseous mixture of hydrogen sulfide and hydrogen, said hydrogen being present in a mol ratio of about 1.5:1 to about 4:1 with respect to said hydrogen sulfide, and maintaining the thus sulfided hydrodesulfurization catalyst under a positive pressure of hydrogen sulfide of about 5 to about 15 pounds per square inch while the sulfided catalyst is being cooled to a temperature below about 400° F.

10. A process for the purification of hydrocarbons and mixtures of hydrocarbons, contaminated by sulfurous and nitrogenous compounds, which comprises passing said hydrocarbons, at a liquid hourly space velocity of from about 1.0 to about 20.0, into a hydrogenation reaction zone maintained under an imposed hydrogen pressure of from about 100 pounds per square inch to about 1000 pounds per square inch and at an inlet temperature thereto within the range of about 200° F. to about 750° F., said reaction zone containing a hydrodesulfurization catalyst consisting of an alumina-silica carrier material composited with the sulfides of molybdenum, nickel and cobalt, removing from said hydrogenation zone a mixture of normally liquid hydrocarbons and normally gaseous material containing hydrogen sulfide and ammonia, thereafter separating said normally gaseous material from said mixture to recover said liquid hydrocarbons substantially free from sulfurous and nitrogenous compounds; said hydrodesulfurization catalyst characterized by the method of preparation which comprises forming an alumina-silica carrier material containing cobalt in an amount from about 0.1% to about 0.7% by weight, and having an alumina to silica weight ratio of from about 7:1 to about 8:1, impregnating said cobalt-containing carrier material with aqueous solutions of molybdenum and nickel compounds to composite therewith from about 5% to about 10 % by weight of molybdenum and from about 1% to about 5% by weight of nickel, oxidizing the resulting impregnated composite to form an alumina-silica-molybdenum oxide-nickel oxide-cobalt oxide composite, thereafter sulfiding the oxidized composite over a temperature range increasing from about 400° F. to about 750–800° F., with a gaseous mixture of hydrogen sulfide and hydrogen, the hydrogen being present therein in a mol ratio of about 1.5:1 to about 4:1 with respect to said hydrogen sulfide, and maintaining the thus sulfided hydrodesulfurization catalyst under a positive hydrogen sulfide pressure of about 5 to about 15 pounds per square inch while the sulfided catalyst is being cooled to a temperature below about 400° F.

11. The process of claim 10 further characterized in that the imposed hydrogen pressure within the hydrogenation reaction zone results from compressive hydrogen recycle in an amount of from about 1000 to about 5000 standard cubic feet per barrel of the liquid hydrocarbons charged to the reaction zone.

12. A process for the purification of olefin-containing hydrocarbons and mixtures of hydrocarbons, contaminated by sulfurous and nitrogenous compounds, which comprises passing said olefin-containing hydrocarbons, at a liquid ratio space velocity of about 1.0 to about 20.0 and in the presence of recycle hydrogen in an amount of about 1000 to about 5000 standard cubic feet per barrel of said hydrocarbons, into a hydrogenation reaction zone maintained under an imposed pressure of from about 100 pounds per square inch to about 1000 pounds per square inch and an inlet temperature thereto within the range of about 200° F. to about 750° F., said hydrogenation reaction zone containing a hydrodesulfurization catalyst consisting of an alumina-silica carrier material composited with the sulfides of molybdenum, nickel and cobalt, removing from said hydrogenation zone a mixture of normally liquid saturated hydrocarbons and normally gaseous material containing hydrogen sulfide and ammonia, thereafter separating the normally gaseous material from said mixture and recovering said liquid saturated hydrocarbons substantially free from sulfurous and nitrogenous compounds; said hydrodesulfurization catalyst characterized by the method of preparation which comprises forming a alumina-silica carrier material containing cobalt in an amount from about 0.1% to about 0.7% by weight, and having an alumina to silica weight ratio within the range of about 7:1 to about 8:1, impregnating said cobalt-containing carrier material with aqueous solutions of molybdenum and nickel compounds to composite therewith from about 5% to about 10% by weight of molybdenum and from about 1% to about 5% by weight of nickel, oxidizing the thus impregnated composite to form an alumina-silica-molybdenum oxide-nickel oxide-cobalt oxide composite, thereafter sulfiding the oxidized catalyst over a temperature range increasing from about 400° F. to about 750–800° F. with hydrogen sulfide containing hydrogen in a mol ratio of about 1.5:1 to about 4:1 with respect to said hydrogen sulfide, and maintaining the thus sulfided hydrodesulfurization catalyst under a positive pressure of hydrogen sulfide of about 5 to about 15 pounds per square inch while the sulfided catalyst is being cooled to a temperature below about 400° F.

13. A method for sulfiding a catalytic composite containing oxides of molybdenum and nickel which comprises contacting said composite with a gaseous mixture of hydrogen sulfide and hydrogen over a temperature range increasing from about 400° F. to about 750–800° F. and thereafter cooling the sulfided composite to below about 400° F. while maintained under a positive pressure of hydrogen sulfide.

14. The method of claim 13 further characterized in that said catalytic composite additionally contains an oxide of cobalt.

References Cited in the file of this patent

UNITED STATES PATENTS

| | | |
|---|---|---|
| 2,880,171 | Flinn | Mar. 31, 1959 |
| 2,905,636 | Watkins et al. | Sept. 22, 1959 |